United States Patent

Hunter et al.

Patent Number: 5,113,343
Date of Patent: May 12, 1992

[54] SEQUENCED CONTROL OF DOUBLE TRANSITION POWERED DOWNSHIFTING IN AN AUTOMATIC TRANSMISSION

[75] Inventors: Joseph H. Hunter; Peter E. Swingler, both of Carmel, Ind.

[73] Assignee: General Motors Corporation, Detroit, Mich.

[21] Appl. No.: 562,063

[22] Filed: Aug. 2, 1990

[51] Int. Cl.⁵ .................. B60K 41/22; F16H 59/46
[52] U.S. Cl. .................. 364/424.1; 74/866; 74/732.1
[58] Field of Search ............ 364/424.1; 74/866, 732.1, 74/336 R; 192/103 F, 103 R, 87.12, 48.7, 48.4, 3.58, 0.033, 0.032, 0.076

[56] References Cited

U.S. PATENT DOCUMENTS

| | | | |
|---|---|---|---|
| 4,517,859 | 5/1985 | Nagaoka et al. | 74/866 |
| 4,580,466 | 4/1986 | Iwanaga | 74/868 |
| 4,628,774 | 12/1986 | Iwanaga | 74/867 X |
| 4,653,351 | 3/1987 | Downs et al. | 74/866 |
| 4,709,596 | 12/1987 | Boda et al. | 74/866 X |
| 4,742,732 | 5/1988 | Hiramatsu | 364/424.1 X |
| 4,793,216 | 12/1988 | Hiramatsu et al. | 364/424.1 X |
| 4,796,490 | 1/1989 | Butts et al. | 74/866 |
| 4,913,004 | 4/1990 | Panoushek et al. | 364/424.1 X |
| 4,989,477 | 2/1991 | Hunter et al. | 74/866 |
| 5,014,573 | 5/1991 | Hunter et al. | 74/866 |

Primary Examiner—Parshotam S. Lall
Assistant Examiner—Thomas S. Auchterlonie
Attorney, Agent, or Firm—Mark A. Navarre

[57] ABSTRACT

In an automatic transmission having an electronic control, a double transition powered downshift to a target range requires the release of two off-going clutches and the engagement of two on-coming clutches. The shift begins by releasing one clutch and applying another to begin (but not complete) an upshift to a third range having a speed ratio lower than both the initial range and the target range so that first an input speed increase occurs followed by an input speed decrease (pull-down). The speed decrease triggers respective application and release of the other clutches to arrest the upshift and complete the downshift. Each clutch application and release occurs gradually under an open loop control. Slip of the first off-going clutch, pull-down, speed sync at the low gear ratio and a near sync condition are determined from turbine speed and output speed and are used to time pressure command changes to smoothly coordinate clutch releases and applications.

9 Claims, 15 Drawing Sheets

| RANGE | C1 | C2 | C3 | C4 | C5 | C6 |
|---|---|---|---|---|---|---|
| LO |  |  | X |  |  | X |
| 1 | X |  |  |  | X |  |
| 2 | X |  |  | X |  |  |
| 3 | X |  | X |  |  |  |
| 4 | X | X |  |  |  |  |
| 5 |  | X | X |  |  |  |
| 6 |  | X |  | X |  |  |
| R |  |  | X |  | X |  |

| RANGE | C1 | C2 | C3 | C4 | C5 | C6 |
|-------|----|----|----|----|----|----|
| LO    |    |    | X  |    |    | X  |
| 1     | X  |    |    |    | X  |    |
| 2     | X  |    |    | X  |    |    |
| 3     | X  |    | X  |    |    |    |
| 4     | X  | X  |    |    |    |    |
| 5     |    | X  | X  |    |    |    |
| 6     |    | X  |    | X  |    |    |
| R     |    |    | X  |    | X  |    |

SEQUENCED CONTROL OF DOUBLE TRANSITION POWERED DOWNSHIFTING IN AN AUTOMATIC TRANSMISSION

FIELD OF THE INVENTION

This invention relates to a method of controlling a shift in an automatic transmission and, more particularly, for a double transition powered downshift.

BACKGROUND OF THE INVENTION

Generally, a motor vehicle automatic transmission includes a number of gear elements coupling its input and output shafts, and a related number of torque establishing devices, such as clutches and brakes, which are selectively engageable to activate certain gear elements for establishing a desired speed ratio between the input and output shafts. The brake can be of the band type or disk type; engineering personnel in the automotive art refer to disc type brakes in transmissions as "clutches" or "reaction clutches". As used herein, the terms "clutches" and "torque transmitting devices" will be used to refer to brakes as well as clutches.

The input shaft is connected to the vehicle engine through a fluid coupling, such as a torque converter, and the output shaft is connected directly to the vehicle wheels. Shifting from one forward speed ratio to another is performed in response to engine throttle and vehicle speed, and generally involves releasing or disengaging the clutch (off-going) associated with the current speed ratio and applying or engaging the clutch (on-coming) associated with the desired speed ratio. In this disclosure, a double transition powered downshift is featured wherein two clutches associated with the current speed ratio are released and two other clutches associated with the desired or target speed ratio are engaged.

The speed ratio is defined as the transmission input speed or turbine speed divided by the output speed. Thus, a low gear range has a high speed ratio and a higher gear range has a lower speed ratio. To perform a downshift, a shift is made from a low speed ratio to a high speed ratio. In the type of transmission involved in this invention, the downshift from first range to low range is accomplished by disengaging two clutches associated with the lower speed ratio and engaging two clutches associated with the higher speed ratio to thereby reconfigure the gear set to operate at the higher speed ratio. Shifts performed in the above manner require precise timing in order to achieve high quality shifting.

SUMMARY OF THE INVENTION

It is an object of this invention to provide a method of controlling a powered downshift in an automatic transmission by engaging first one clutch and then another clutch by an open loop control, while disengaging two other clutches and using transmission speed feedback to time the clutch control events. In particular, a motor vehicle automatic transmission with an electronic control system achieves high quality double transition powered downshifts by first allowing slip of an off-going clutch, then beginning (but not completing) an upshift to a range higher than the target range and finally downshifting to the target range.

BRIEF DESCRIPTION OF THE DRAWINGS

The above and other advantages of the invention will become more apparent from the following description taken in conjunction with the accompanying drawings wherein like references refer to like parts and wherein:

FIG. 1b is a diagram illustrating the clutch engagements required to establish the various speed ratios of the transmission depicted in FIG. 1a.

FIGS. 2 and 3a-3b are flow diagrams representative of computer program instructions executed by the computer-based controller of FIG. 1a in carrying out the shift control of the transmission.

DETAILED DESCRIPTION OF THE INVENTION

Figure 1A:
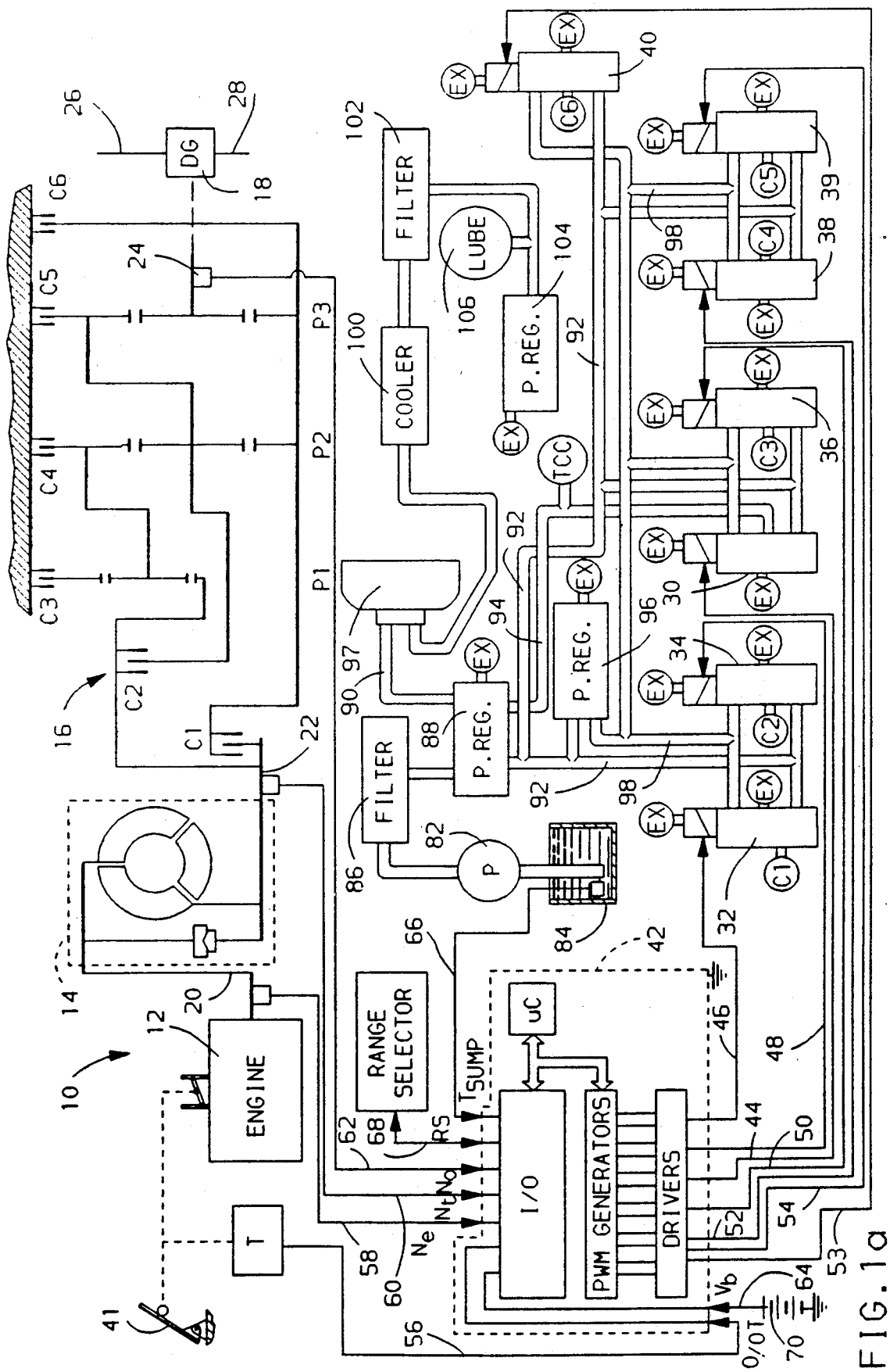
FIG. 1a is a system diagram of a fluid operated motor vehicle transmission, including several solenoid operated fluid pressure control valves, and a computer-based control unit for carrying out the voltage control temperature of the invention.

Referring now to the drawings, and more particularly to FIG. 1a, the reference numeral 10 generally designates a motor vehicle drive train including a throttled internal combustion engine 12, a fluidic torque converter 14, a seven-speed fluid operated power transmission 16 and a differential gear set (DG) 18. The engine 12 is connected to the torque converter 14 via shaft 20, the torque converter 14 is connected to the transmission 16 via shaft 22, the transmission 16 is connected to the differential gear set 18 via shaft 24 and the differential gearset is connected to a pair of drive wheels (not shown) via the prop shafts 26 and 28.

Gear shifts are accomplished by selectively engaging and disengaging brakes and clutches, herein called torque transmitting devices or clutches. These clutches are actuated by hydraulic pressure, and upon engagement require a fill time before torque is transmitted between a driving and a driven friction element.

The speed and torque relationships between the engine 12 and the drive wheels of the vehicle are controlled by a fluid operated torque converter clutch, designated TCC, and six fluid operated transmission clutches, designated C1–C6. The torque converter clutch TCC is selectively engaged by the solenoid operated control valve 30 to mechanically connect the impeller I and turbine T of torque converter 14. The clutches TCC, C1, C2, C3, C4, C5, C6 are selectively engaged and disengaged by the solenoid operated control valves 30, 32, 34, 36, 38, 39, 40 according to the diagram shown in FIG. 1b, to selectively establish a desired transmission speed ratio. That diagram shows that to downshift from first to low range, clutches C1 and C5 are released and clutches C3 and C6 are engaged. The illustrated transmission gear set provides one reverse ratio and seven forward ratios. An operator manipulated accelerator pedal 41 positions the engine throttle for controlling the engine power output.

The operation of the solenoid operated control valves 30-40 is controlled by a computer-based control unit 42 via lines 44-54 in response to various input signals representative of system parameters. Such inputs include an engine throttle position signal %T on line 56, an engine output shaft speed signal Ne on line 58, a torque converter output shaft speed signal Nt on line 60, a transmission output shaft speed signal No on line 62, a system supply voltage signal Vb on line 64, a transmission fluid temperature signal Tsump on line 66 and an operator range selector position signal RS on line 68. The system voltage is supplied by the storage battery 70, and the input signals are obtained with conventional electrical transducers such as potentiometers, thermistors and magnetic speed pickups.

Internally, the control unit 42 comprises a number of conventional devices, including a microcomputer (uC) with internal clock and memory, an input/output device (I/O) and an array of PWM generators (PWM) and drivers (DR). As indicated below, a PWM generator and a driver (DR) are dedicated to each solenoid control valve 30-40. The PWM outputs are delivered to the respective drivers (DR) and are used to energize the respective solenoid control valves. The duty cycle of the PWM outputs determine the hydraulic pressure supplied by the solenoid control valves, with a low percent duty cycle yielding a low pressure and a high percent duty cycle yielding a high pressure for a normally closed valve.

The hydraulic circuit of transmission 16 includes a positive displacement pump 82 for supplying pressurized hydraulic fluid from the sump or reservoir 84, to the clutches TCC and C1-C6 through various hydraulic and electro-hydraulic valving mechanisms. After passing through a main circuit filter 86, the fluid output of pump 82 is directed to a main pressure regulator valve 88 which develops regulated fluid pressures in lines 90 and 92.

The fluid in line 90, generally referred to as converter feed pressure, is directed through the torque converter 14, as schematically designated by the converter shell 97. After passing through a cooler 100 and cooler filter 102, the converter fluid is then regulated down to a lower pressure by the regulator valve 104 and directed to the transmission lube circuit, as designated by the bubble 106.

The fluid in line 92, generally referred to as main or line pressure, is supplied as an input to the clutch control valves 30-40, and also to the control pressure regulator valve 96. The control pressure regulator valve 96 develops a somewhat lower pressure in line 98, referred to herein as the control pressure, such pressure being directed to the solenoid of each control valve 30-40.

The fluid in line 94, referred to as the converter clutch pressure, is supplied directly by solenoid 30 to the torque converter clutch TCC to engage the same. This pressure is also supplied to the main regulator valve 88 to provide a lower regulated line pressure in the converter lock-up mode.

Figures 1B, 2:
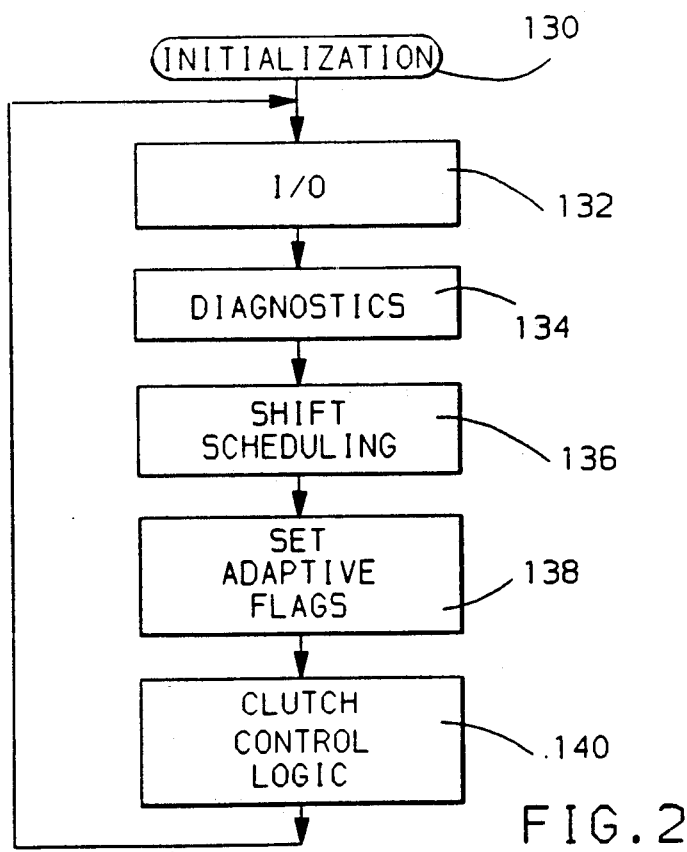

FIGS. 2, 3 and 5-18 are flow diagrams representative of computer program instructions executed by the computer-based control unit 42 of FIG. 1 in carrying out the shift control technique of this invention. In the description of the flow diagrams other than FIG. 2, the functional explanation marked with numerals in angle brackets, <nn>, refers to blocks bearing that number.

FIG. 2 represents an executive or main loop program which directs the sequential execution of various subroutines. Block 130 designates a series of instructions executed at the initiation of each period of vehicle operation for setting the various timers, registers and variable values of control unit 42 to predetermined initial values. Thereafter, the blocks 132-140 are sequentially and repeatedly executed as indicated by the flow diagram lines. Block 132 reads the various input signal values and outputs the required control signals to the PWM generators and drivers for solenoid controlled valves 30-40. Blocks 134-138 contain diagnostic, shift scheduling, and adaptive flag logic. The clutch control logic block 140 analyzes the various system input signals described above in reference to FIG. 1a, develops pressure command signals PCMD for application to the solenoid operated control valves at the next execution of block 132, and computes adaptive corrections based on the adaptive flags at shift completion. Block 140 also effects pulse width modulation of the solenoid drive voltage to carry out the pressure commands for specific shift operations. Block 140 is detailed in the flow chart of FIGS. 3a-3b.

Figure 3A:
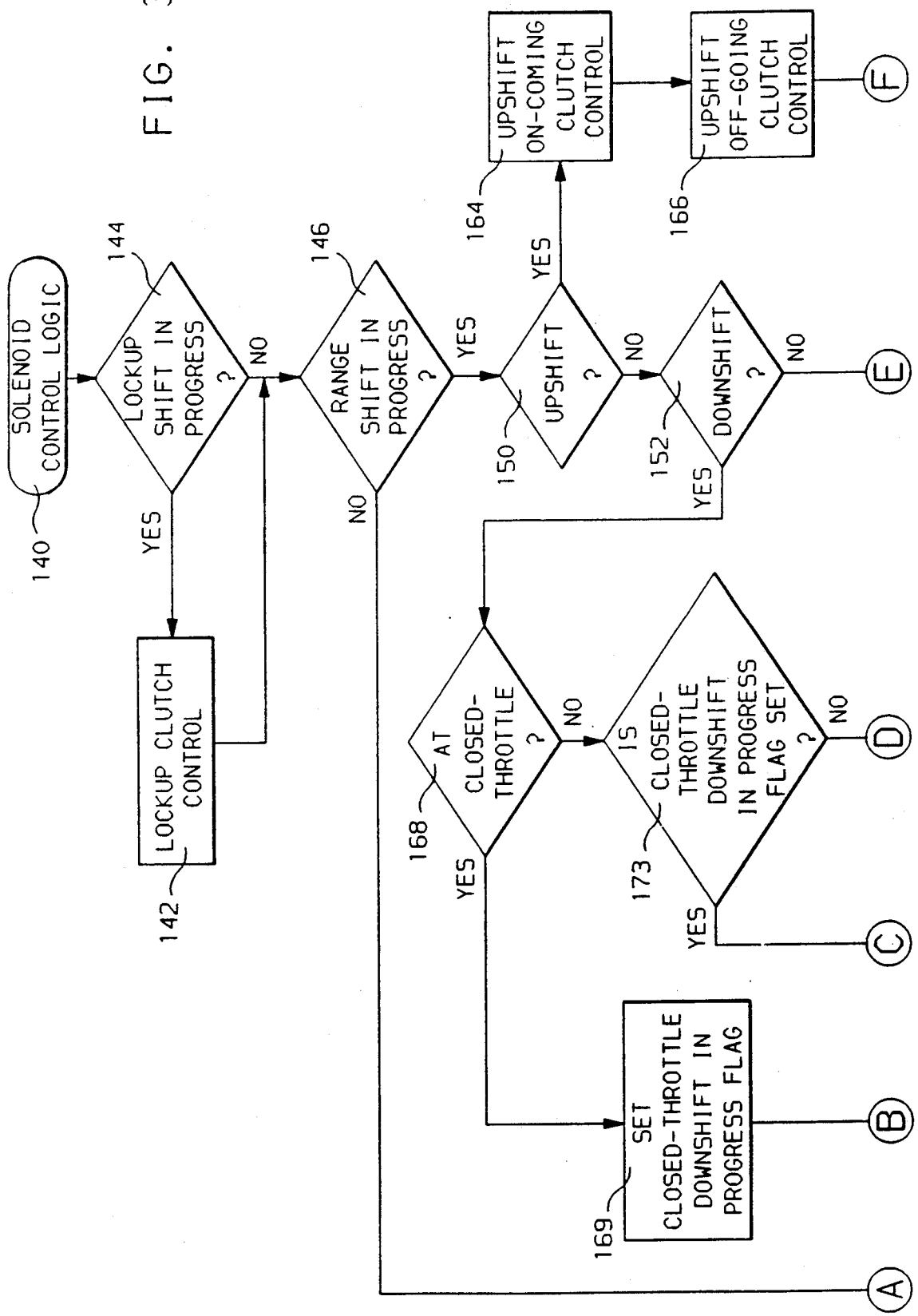
Figure 3B:
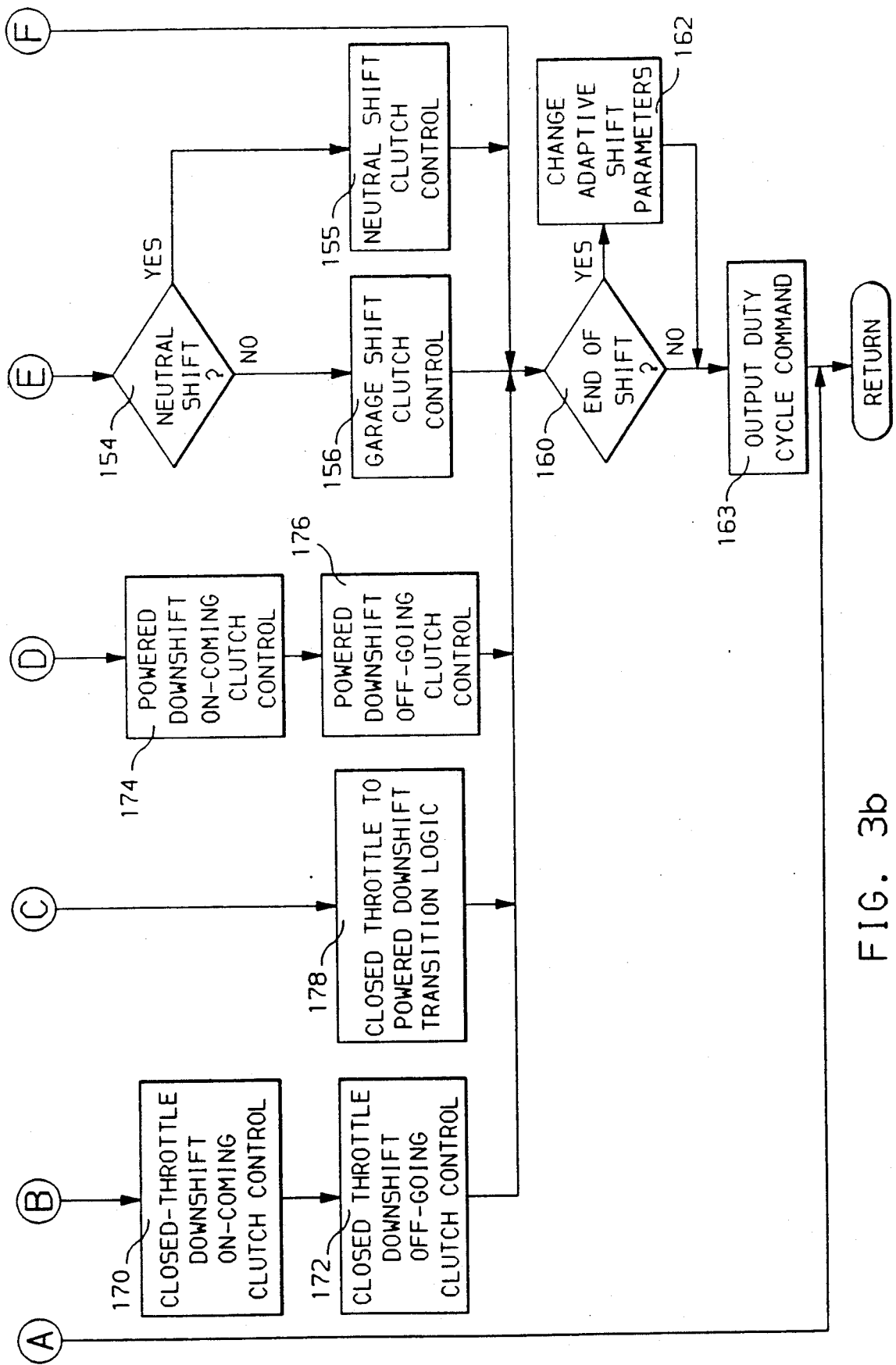

The flow diagram of FIGS. 3a-3b sets forth the program for making decisions as to the type of range shift in progress, if any, whether a shift is double transition, and determines the specific control for the on-coming and the off-going clutches. The program also checks whether a shift has performed within specifications, and if not, certain shift parameters are changed at shift completion according to predefined adaptive logic to correct the shift. First, lockup clutch control is executed <142> if a lockup shift is in progress <144>, and it is then determined (from the shift schedule) whether a range shift is in progress <146>. If not, the clutch control logic is exited. If a range shift is in progress <146>, it is determined whether it is an upshift <150>, a downshift <152>, a neutral shift <154> and, if none of these, it must be a garage shift <156> which executes shifts from neutral to either drive or reverse and shifts from drive to reverse or from reverse to drive. If it is a neutral shift <154>, the neutral shift clutch control executes shifts from drive to neutral or from reverse to neutral <155>. The control flows from either the upshift, downshift, neutral shift or the garage shift block to the end-of-shift test <160>. Then, if the shift is completed <160>, adaptive shift parameters are changed if required <162>, and the duty cycle command is output <163>. If the shift has not ended <160>, the duty cycle command is output <163> before returning to the main loop (FIG. 2).

If an upshift is indicated <150>, the upshift on-coming clutch control is activated <164>, and the upshift off-going clutch control is activated <166>. If a downshift is indicated <152>, it is next decided whether it is a closed throttle downshift or a powered downshift <168>. If it is closed throttle, a closed-throttle in progress flag is set <169>, the closed throttle on-coming clutch control is activated <170> and the closed throttle off-going clutch control is activated <172>. If it is not at closed throttle <168>, the closed throttle flag is checked <173>. If the flag is not set, the powered downshift on-coming clutch control is activated <174> and then the powered downshift off-going clutch control is activated <176>. If the block 173 determines that the closed throttle flag is set, that indicates that the throttle opened during the course of the closed throttle downshift and a transition to powered downshift may be necessary; then appropriate transition logic is invoked <178>. Finally, the program goes to the end of shift test <160>.

Each control phase operates by setting pressures, pressure increments, times or other values to predefined calibrated values which are herein generally called "set", "preset", "given" or "certain" values. Each such value is chosen from a table of calibrated values for each specific transmission condition and shift type. Thus, different values are supplied for upshift, downshift, etc., as well as each range shift, e.g., Low-1, 1-2, 2-1, 4-3, 5-4, etc. Converter and lockup modes may also require separate sets of calibration values.

Figure 4A:
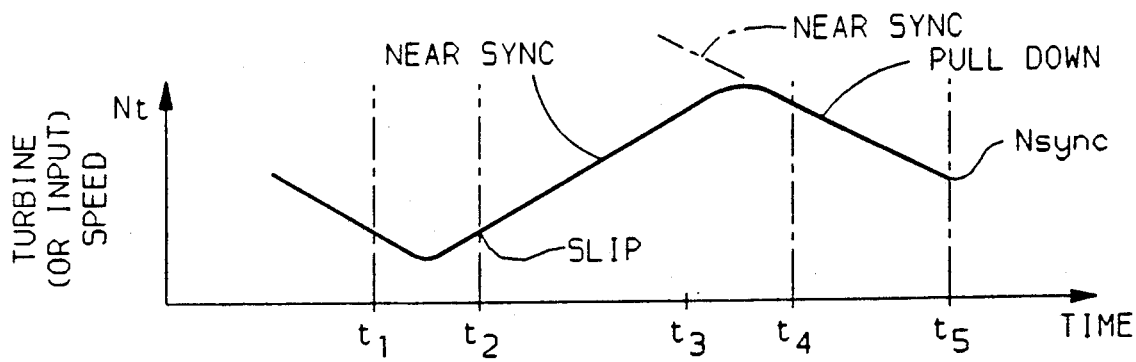
FIGS. 4a-4e are graphs illustrating turbine speed, first and second off-going pressure commands and first and second on-coming pressure commands, respectively, for double transition shifting according to the invention.
Figure 4B:
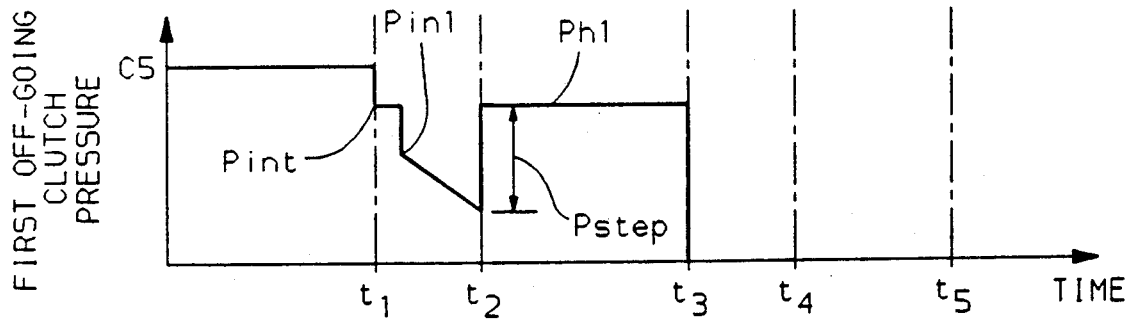
Figure 4C:
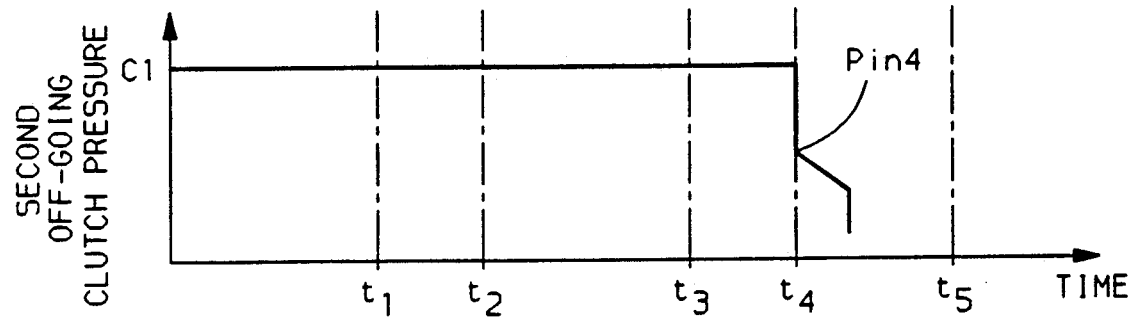
Figure 4D:
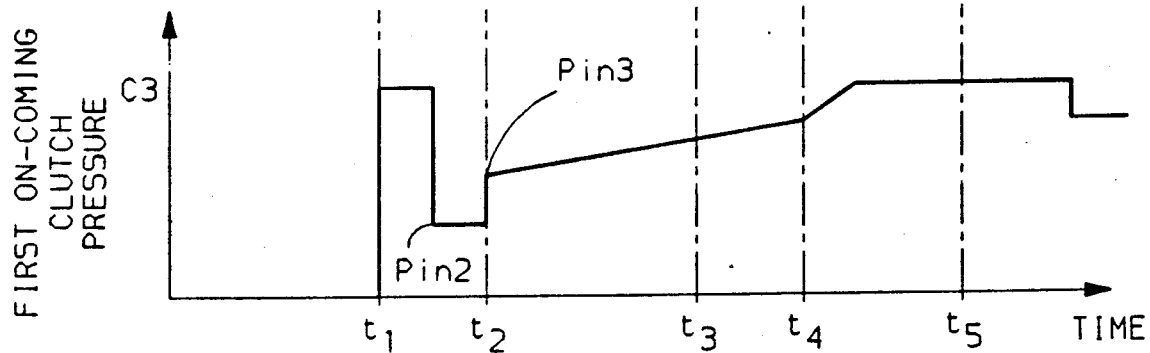
Figure 4E:
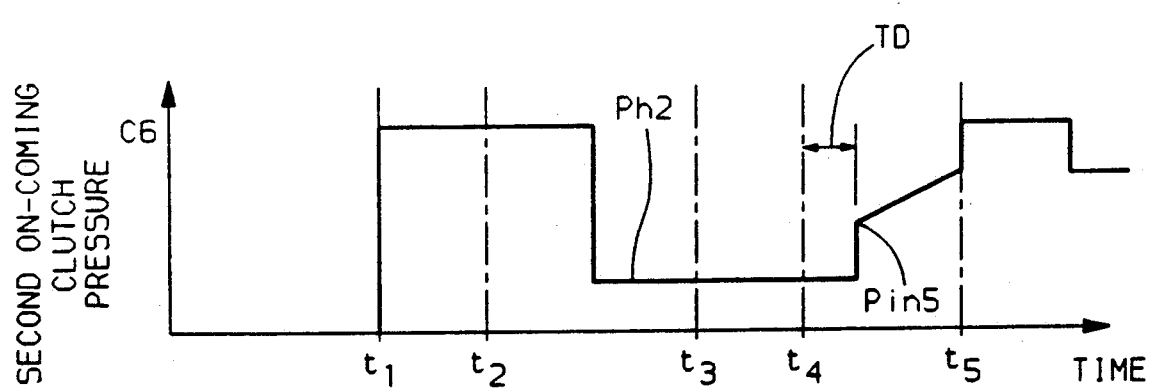

FIG. 4a-4e, detail the controlled clutch pressures for a powered downshift from first to low range, as well as the turbine speed or input speed. FIG. 4a is a graph of turbine speed versus time. FIG. 4b shows the commanded pressure versus time for the first off-going clutch C5, FIG. 4c the commanded pressure versus time for the second off-going clutch C1, FIG. 4d shows the commanded pressure versus time for the first on-coming clutch C3 and FIG. 4e shows the commanded pressure versus time for the second on-coming clutch C6. The clutches are controlled in a manner to first allow an off-going clutch to slip to achieve a near sync condition and then begin (but not complete) a transition (upshift) from first range to third and, as soon as turbine speed pull-down is detected, to effect a second transition (downshift) to low range.

The FIG. 4a curve is typical for the case of decreasing vehicle speed while climbing a grade prior to shift initiation at time t1, and indicates the turbine speed during the first range, the speed increase due to slip of the off-going clutch, then the speed decrease or pull-down due to the effect of the first on-coming clutch during the transition toward third range. The speed decrease continues in a low range synchronization condition to Nsync where the shift is completed.

Pull-up or first off-going clutch slip is detected at time t2 by sensing when the turbine speed increases a set amount above the output speed multiplied by the first range speed ratio or $Nt > No * SR(1st) + K1$. The speed increases after slip and at time t3 a turbine speed near synchronous speed is attained or $Nt > No * SR(low) - K2$. The synchronous speed is graphically indicated by the dashed line labeled No*SR(Low) and the solid line between times t4 and t5. After time t3, the turbine speed Nt passes through a maximum Nt(max) and then decreases. At time t4 pull-down is detected when the speed drops a certain amount below the peak or $Nt < Nt(max) - K3$. The time t5 at "Nsync" is the end of the shift as determined by "target synchronous speed" being detected in a set number (N) of consecutive computer control loops. The target sync is defined as Nt being within the window $No * SR(low) \pm K4$. Each of the "K" terms is a calibrated constant to establish a desired window size. K4, for example may be on the order of 50 RPM so that target sync occurs when the turbine speed is within 50 RPM of No * SR(low). The constant K2 for near sync may be about 200 RPM so that near sync occurs when the turbine speed is 200 RPM below No * SR(low).

Referring to FIGS. 4b, 4d and 4e, it may be observed that upon shift initiation (the time t1 of the shift command), the pressure commands for the on-coming clutches C3 and C6 are set to the maximum pressure value to begin filling the clutch cavities, and the pressure on off-going clutch C5 is reduced to an intermediate value, Pint, for a brief time and is then reduced to an initial value, Pin1, and is decreased at a set ramp rate. The brief intermediate value, Pint, is effective to reduce clutch pressure undershoot caused by solenoid dynamics. The initial value Pin1 coupled with the ramp rate is sufficient to ensure torque capacity while permitting slip of the off-going clutch until the first on-coming clutch can assume some torque capacity. For the first on-coming clutch, C3, part D shows that maximum pressure is commanded for a fill time. The fill time allows nearly complete stroking of the clutch plates and obtains clutch torque capacity. Then the command pressure drops to an initial value, Pin2, at which the clutch remains full but has no significant capacity, and is held there in readiness to quickly assume torque capacity. The decreasing ramp on off-going clutch C5 allows the clutch to slip and the turbine speed Nt to increase. When the off-going clutch starts to slip, the coefficient of friction of the clutch changes from a static to a dynamic level. The friction reduction and its associated decrease in clutch torque capacity is compensated for by increasing the clutch pressure in a step fashion to a level at which the torque capacity of the clutch remains nearly constant. Thus, when slip is detected at time t2, C5 pressure is commanded to increase by a fixed increment Pstep to a hold pressure Ph1 to maintain the torque capacity and prevent turbine overspeed. Also at the time t2, the on-coming clutch C3 pressure is commanded to an initial pressure Pin3 and then ramps up slowly at a first ramp rate. The combination of the on-coming upward ramp and the slipping of the off-going clutch results in a torque transition from the first off-going clutch, C5, to the first on-coming clutch, C3. When the near sync condition is detected at time t3, the pressure command for the off-going clutch C5 is reduced to zero to exhaust that clutch and minimize clutch tie-up. The continuing transition to the intermediate range due to the increasing capacity of the on-coming clutch C3 causes the turbine speed to peak at value Nt(max) and start to decline.

Upon the detection of pull-down at time t4, the pressure command for the on-coming clutch C3 is changed to a second, greater ramp rate to complete that clutch application, as shown in FIG. 4d. At the same time, t4, exhaust of the second off-going clutch C1 has been commenced by reducing the pressure command to an initial value Pin4 and starting a decreasing ramp. The ramp continues to zero pressure or until a set time expires and the pressure command is set to zero. During the above events, the second on-coming clutch, C6, is filled for a preset fill time and then is commanded to a hold value Ph2. The detection of pull-down at time t4 starts a time delay TD after which the pressure command for clutch C6 is increased to an initial value Pin5 followed by an increasing ramp to gradually apply the clutch C6. This timing allows for clutch exhaust time delays and reduces torque tie-up between the second off-going and second on-coming clutches.

This control phase continues until time t5 when a set number N of target range syncs have been detected, at which time the shift is completed and both on-coming clutches are fully applied by commanding maximum pressure if it has not already been reached.

The downshift process is characterized by open loop control and events such as clutch slip, pull-down, target range synchronization and near synchronization are used to control clutch application and release thereby providing controlled timing of the clutches.

Figure 5:
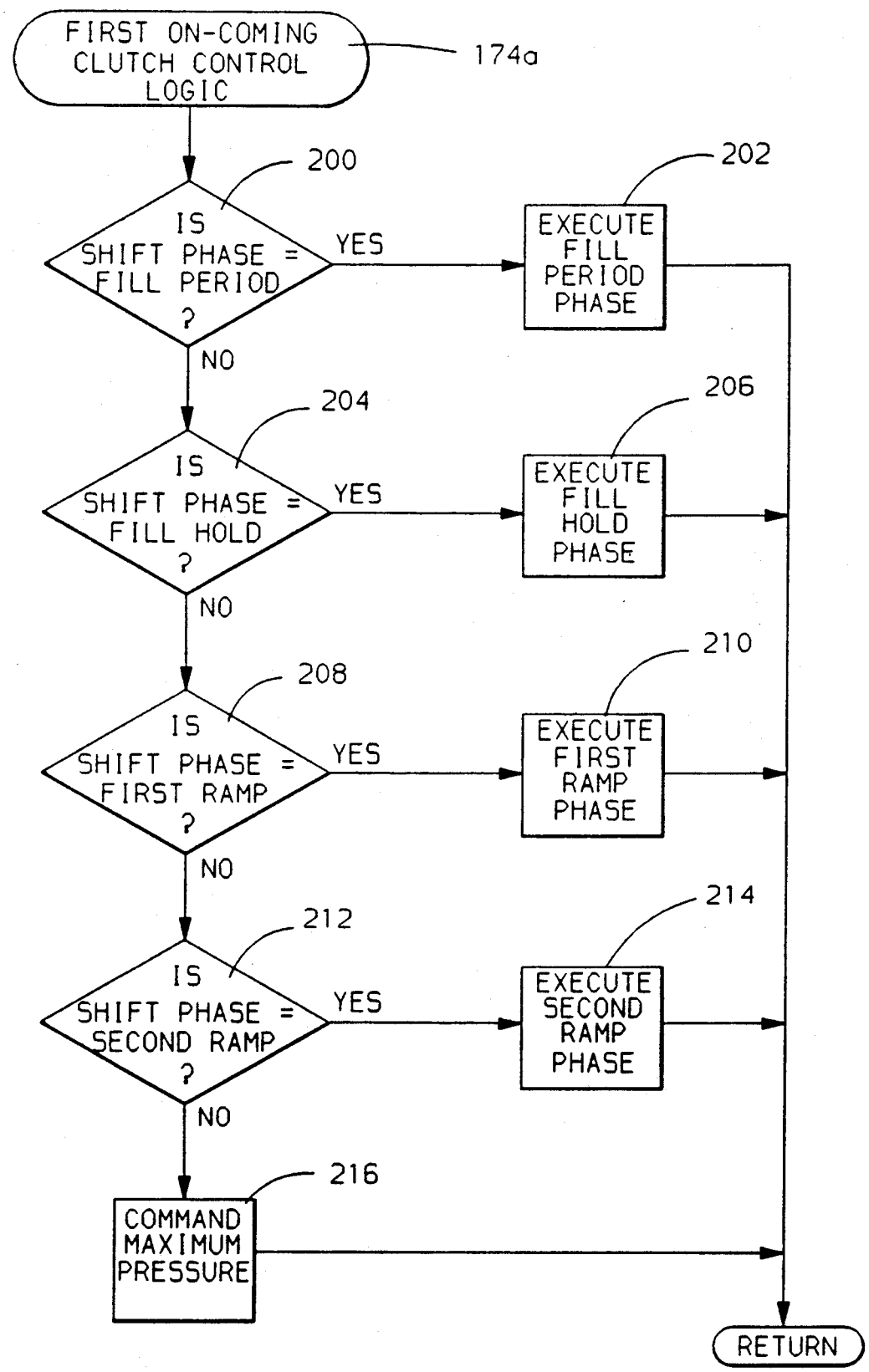
FIGS. 5 through 8 are flow diagrams for the first on-coming clutch control logic, according to the invention.

The flow charts of FIGS. 5-18 illustrate the control logic incorporated in the program for shift control. In these charts, SHIFT PHASE is a pointer for indicating the stage of shift process for each clutch. In FIG. 3, the block 174 includes the first on-coming clutch control logic 174a and the second on-coming clutch control logic 174b. FIG. 5 shows the logic flow for the first on-coming clutch control 174a. If SHIFT PHASE is Fill Period <200>, the Fill Period phase is executed <202>. If SHIFT PHASE is in Fill Hold <204>, the Fill Hold routine is run <206>. If SHIFT PHASE equals First Ramp <208>, the First Ramp phase is executed <210>. If SHIFT PHASE equals Second Ramp <212>, the Second Ramp phase is executed <214>. If SHIFT PHASE is none of these, the maximum pressure is commanded <216>.

Figure 6:
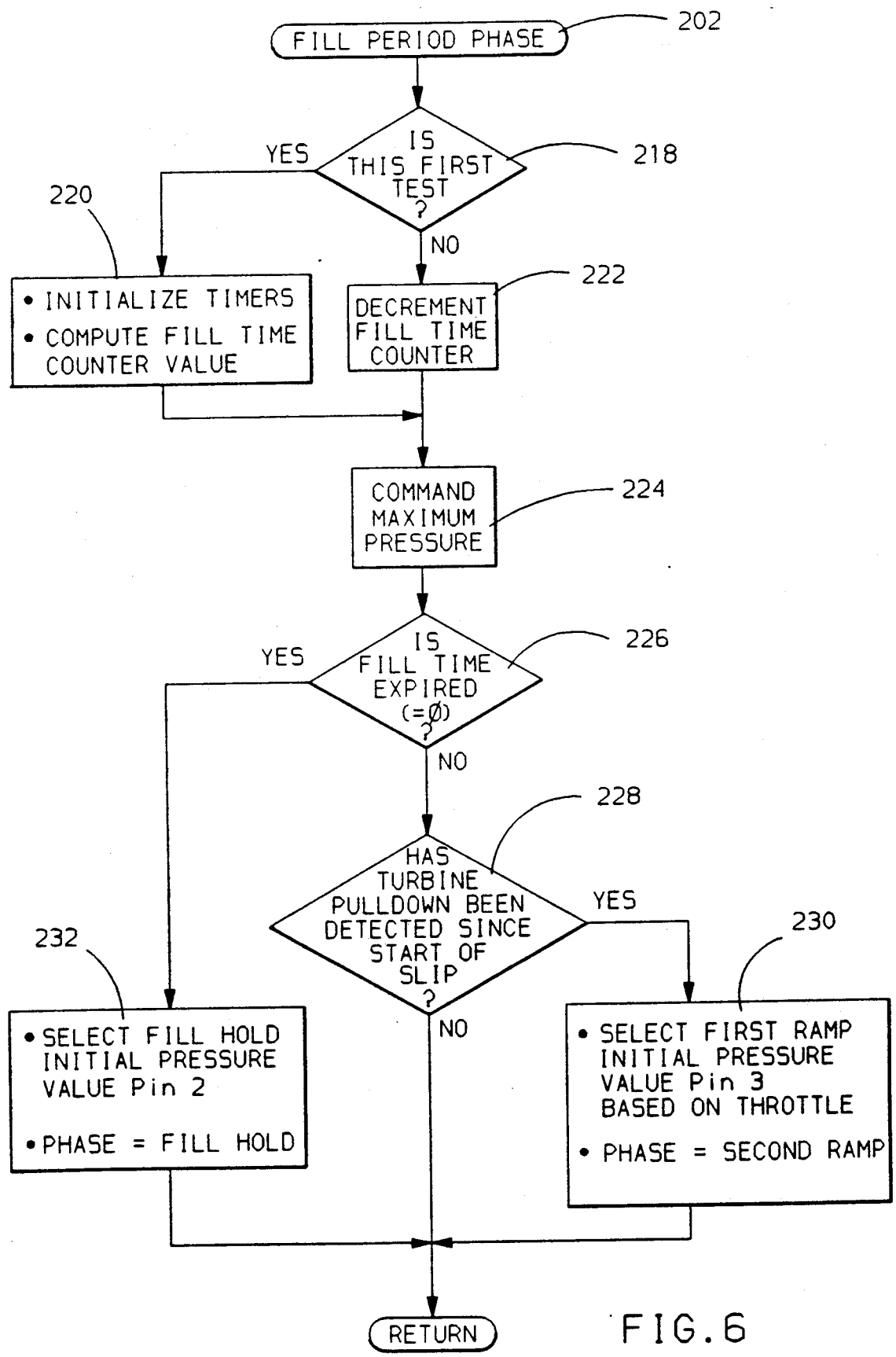

FIG. 6 shows the Fill Period phase logic 202. If it is the first time through the loop <218> timers are initialized and a fill time counter value is computed <220>: if it is not the first time through the loop, the fill time counter is decremented <222>. Next, the maximum pressure is commanded <224> and if the fill time has not expired <226>, a test is made for turbine pull-down <228> and if none has been detected the routine returns to the main program. Pull-down usually does not happen in this circumstance except in the case of miscalibration. If it does happen <228>, a first ramp initial pressure is selected based on throttle value and the SHIFT PHASE is set to Second Ramp <230>. However, if the fill time counter has decremented to zero <226> initial pressure Pin2 is selected and the SHIFT PHASE is set to Fill Hold <232>. In the Fill Hold phase (not shown), the initial pressure Pin2 is maintained until slip is detected, and then SHIFT PHASE is set to First Ramp.

Figures 7, 8:
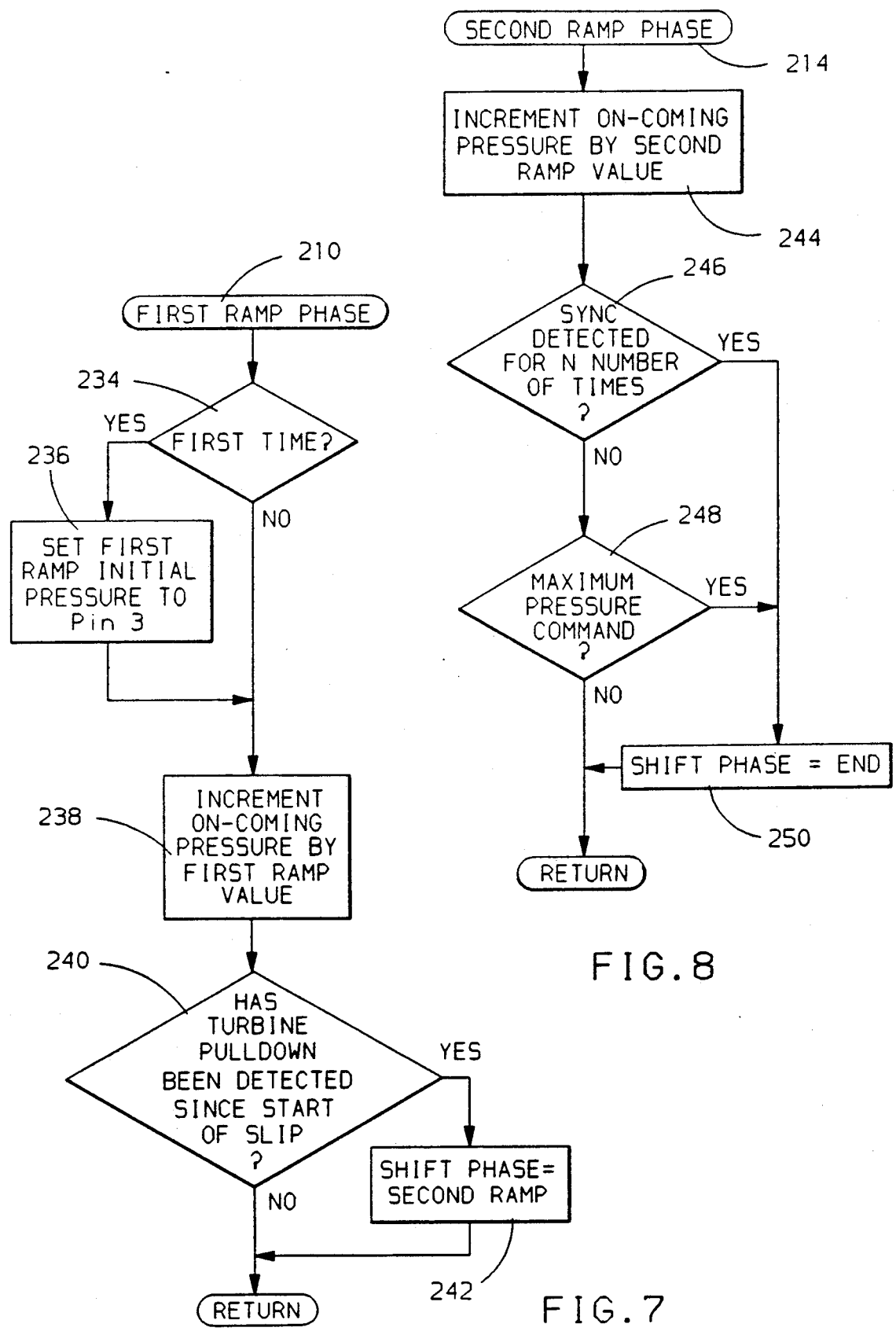

In the First Ramp phase 210, shown in FIG. 7, if it is the first time through the loop <234>, the first ramp initial pressure Pin3 is set <236>. If not the first time through <234>, the on-coming pressure is incremented by a set value <238> and if pull-down is detected <240> SHIFT PHASE is set to Second Ramp <242>. Otherwise, the program continues to the main loop.

FIG. 8 shows the Second Ramp phase 214. The on-coming pressure is incremented by a second set value <244>. If synchronization is detected for a set number of times <246>, or the pressure command reaches the maximum value <248>, the SHIFT PHASE is set to End <250> to apply maximum pressure <216> and complete the application of the first on-coming clutch.

Figure 9:
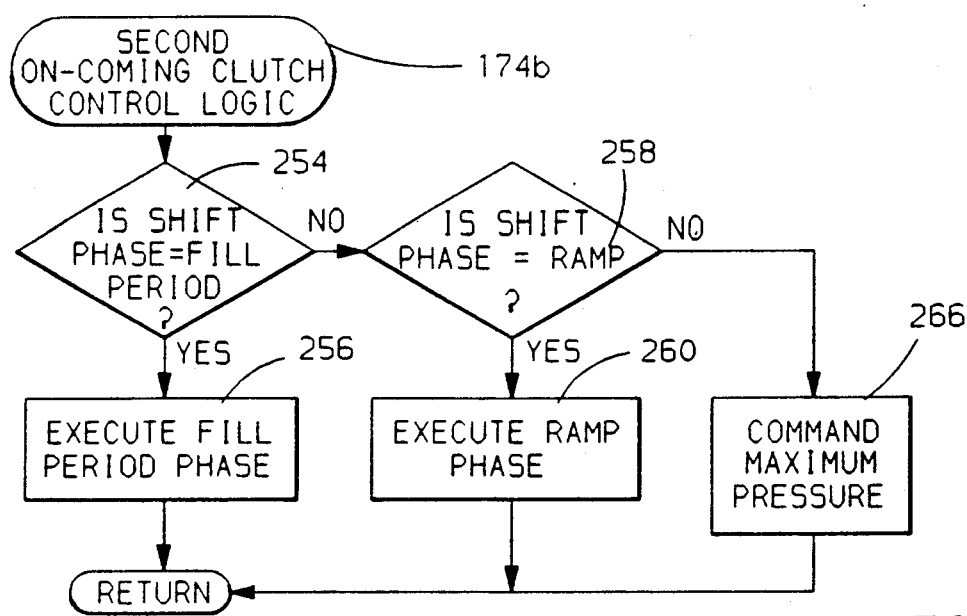
FIGS. 9 through 11 are flow diagrams for the second on-coming clutch control logic, according to the invention.

The second on-coming clutch control logic diagram 174b is shown in FIG. 9. If SHIFT PHASE is equal to Fill Period <254>, the Fill period phase is executed <256>. If SHIFT PHASE is set to Ramp <258>, the Ramp phase is executed <260>. If SHIFT PHASE equals none of these, the maximum pressure is commanded <266>.

Figure 10:
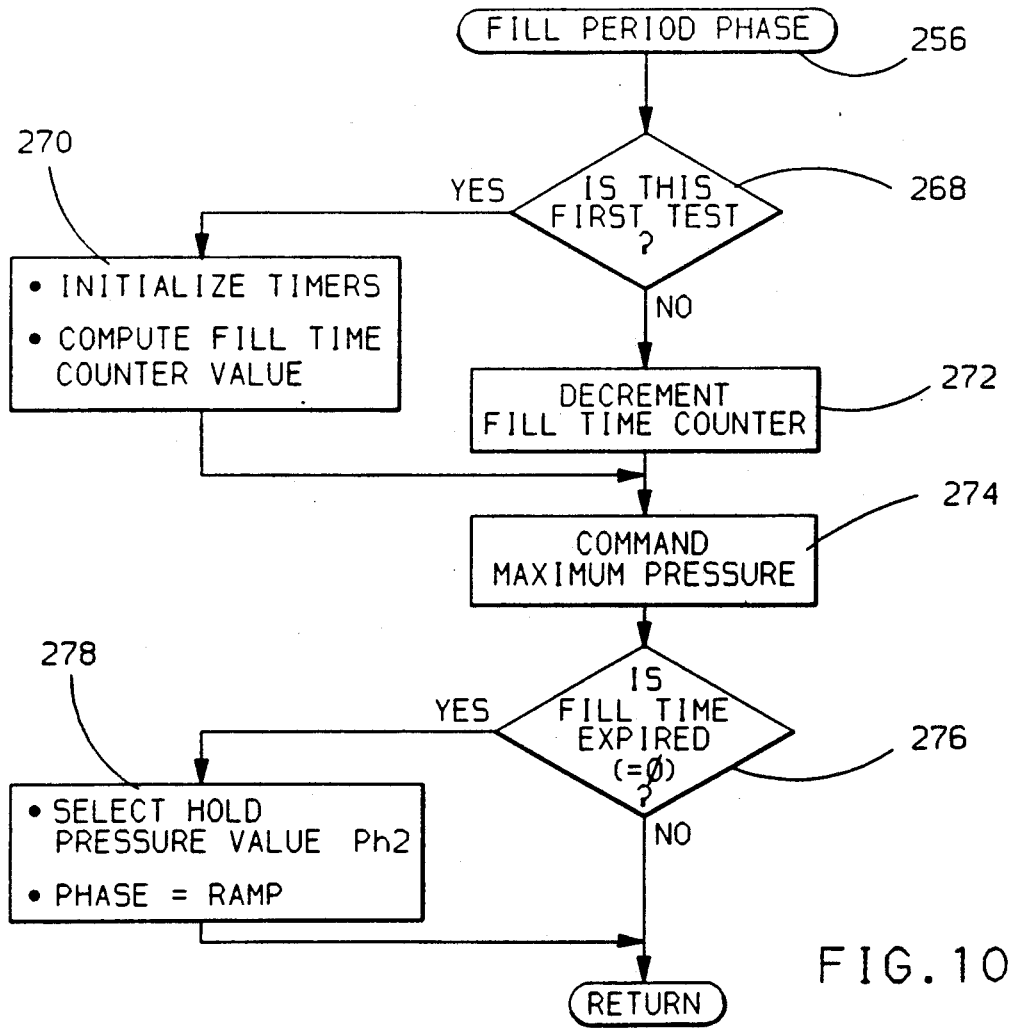

In the Fill Period phase 256 as shown in FIG. 10, if it is the first time through the loop <268>, timers and parameters are initialized and the fill time counter value is computed <270>, and if not the first time, the fill time counter is decremented <272>. Next, the maximum pressure is commanded <274> and the routine returns to the main program. However, if the fill time counter has decremented to zero <276>, the hold pressure Ph2 is selected and the SHIFT PHASE is set to Ramp <278>.

Figure 11:
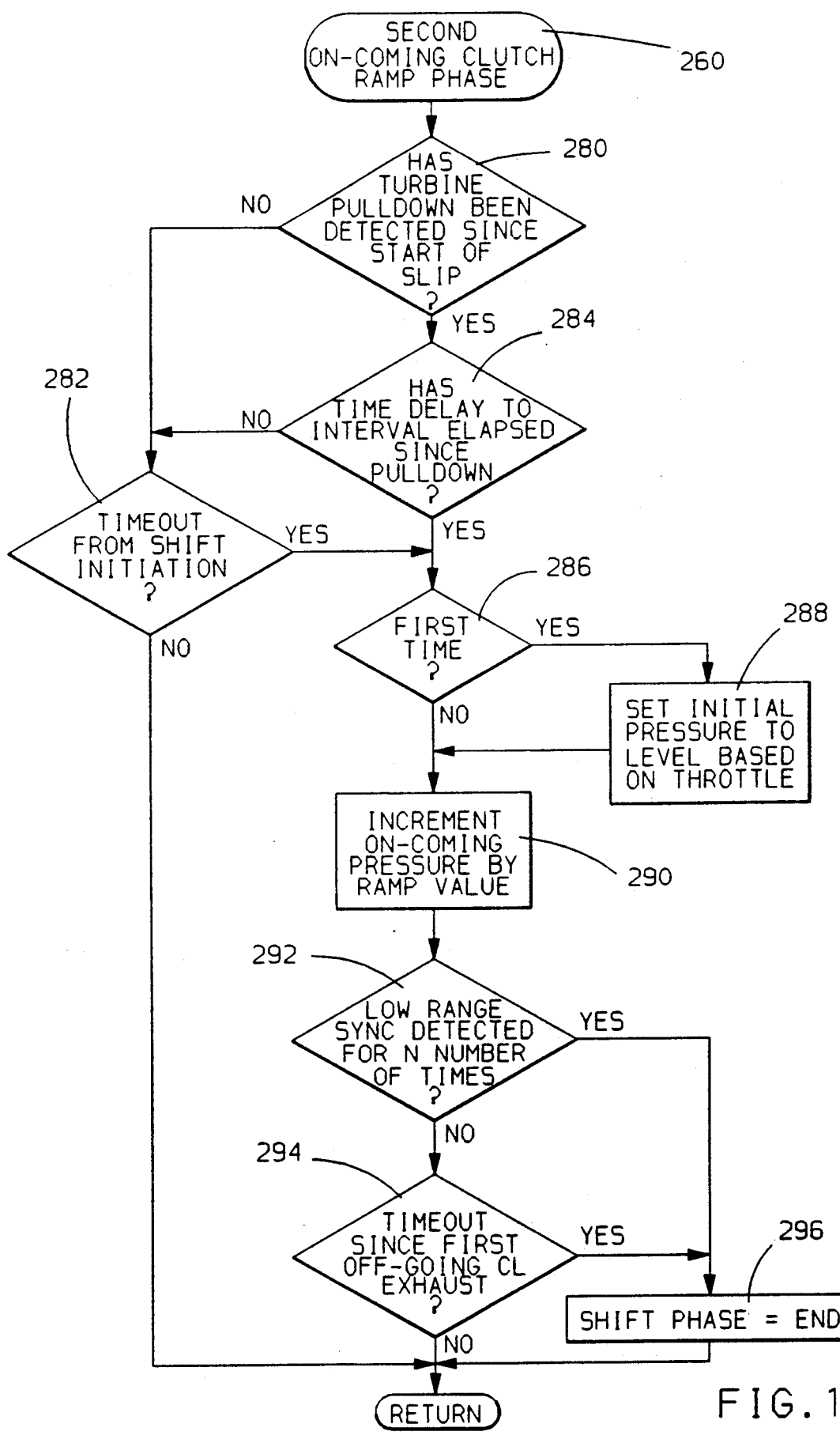

The Ramp phase 260, as shown in FIG. 11, tests for turbine pull-down <280>, and if it is not detected and a time from shift initiation has not expired <282>, the routine returns to the main program and the pressure Ph2 is maintained. If the time has expired <282> or pull-down is detected <280> and a time delay TD after pull-down has expired <284>, the ramp loop is entered. If it is the first time through the ramp loop <286>, the initial pressure Pin5 is set based on throttle value <288>. Each time through the loop, the pressure is incremented <290> and the program returns to the main loop; however, if target synchronization is reached N times time has elapsed since exhaust of the first off-going clutch <294>, SHIFT PHASE is set to End <296> to effect maximum pressure on the second on-coming clutch to complete the shift.

Figure 12:
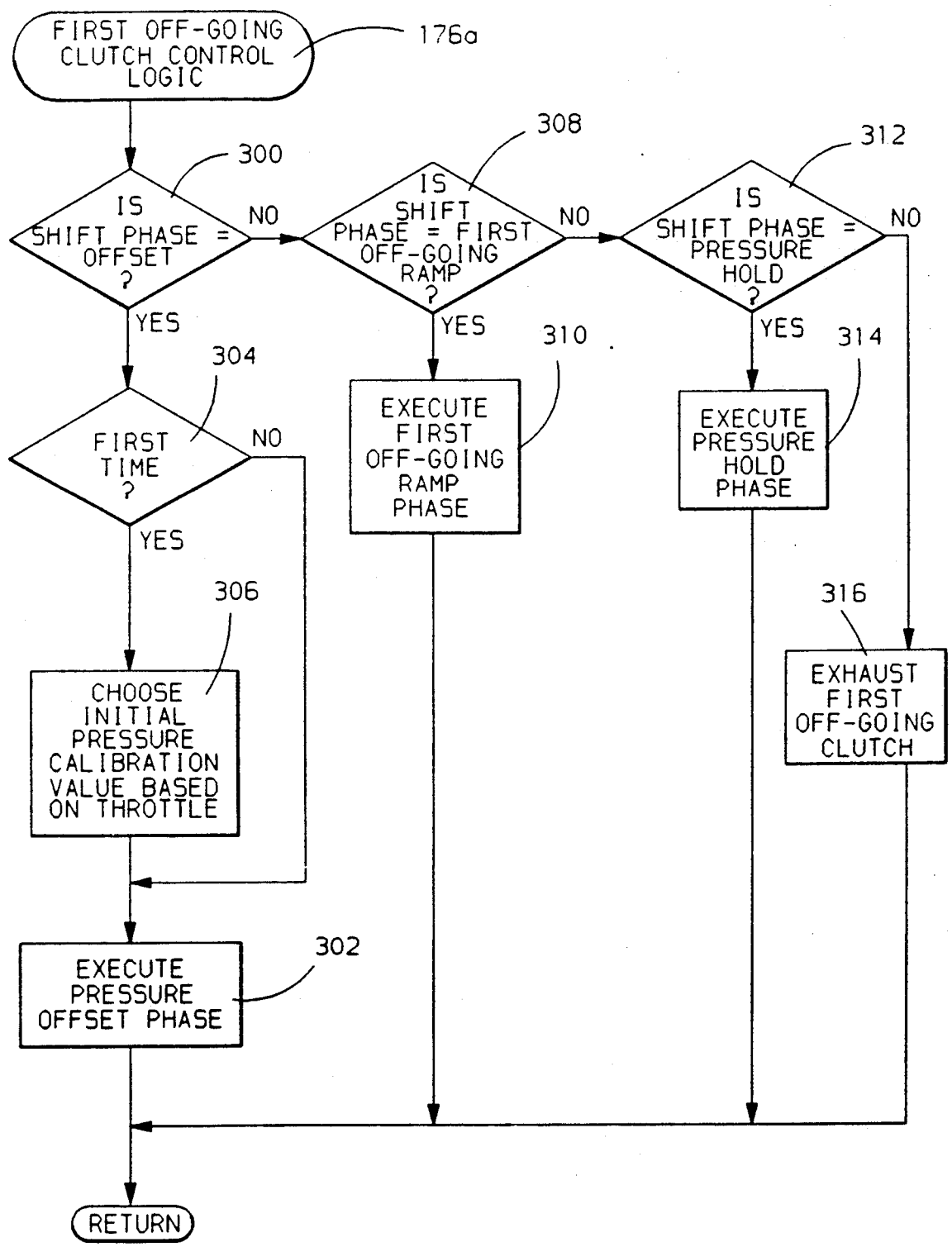
FIGS. 12 through 15 are flow diagrams for the first off-going clutch control logic, according to the invention.

The off-going clutch control block 176 of FIG. 3 includes the first off-going clutch control logic 176a and second off-going clutch control logic 176b. The logic diagram for the first off-going clutch C5 is shown in FIG. 12. If SHIFT PHASE equals Offset <300>, the Offset phase is executed <302>. If it is the first time through the Offset loop <304>, initial pressure value Pin1 is chosen based on throttle value <306>. If SHIFT PHASE is set to First Off-going Ramp <308>, the First Off-going Ramp routine is executed <310>. If SHIFT PHASE is set to Pressure Hold <312>, the Pressure Hold phase is executed <314>. Otherwise, the clutch is exhausted <316>.

Figure 13:
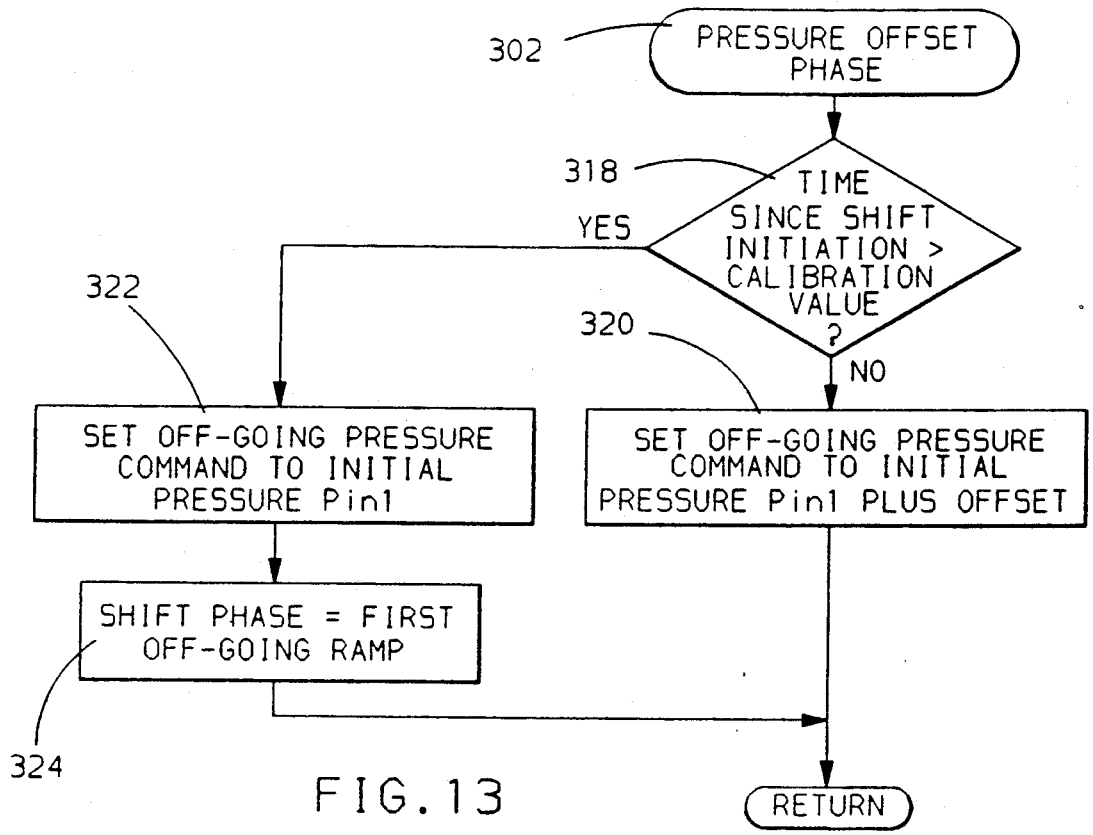

The Pressure Offset phase routine shown in FIG. 13 tests whether the time since shift initiation exceeds a set value <318>. If not, the off-going pressure is set at the initial pressure Pin1 plus an offset value to obtain the intermediate pressure Pint <320>. If the elapsed time exceeds the value <318>, the pressure command is set to the initial pressure Pin1 <322> and then the SHIFT PHASE is set to First Off-going Ramp <324>.

Figure 14:
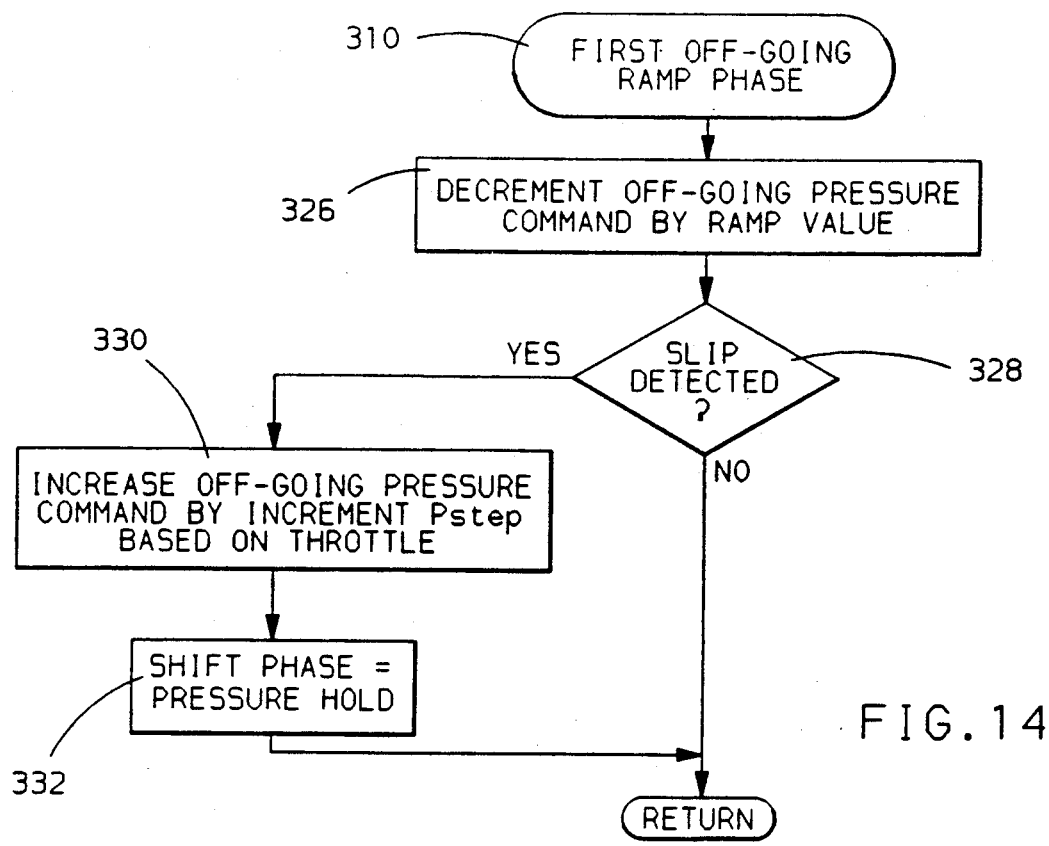

The First Off-going Ramp routine <310> is shown in FIG. 14. The pressure command is decremented by a set value <326> and if slip is not detected <328>, the program returns to the main loop. If slip is detected, the pressure command is increased by an amount Pstep based on throttle value <330> and then SHIFT PHASE is set to Pressure Hold <332>.

Figure 15:
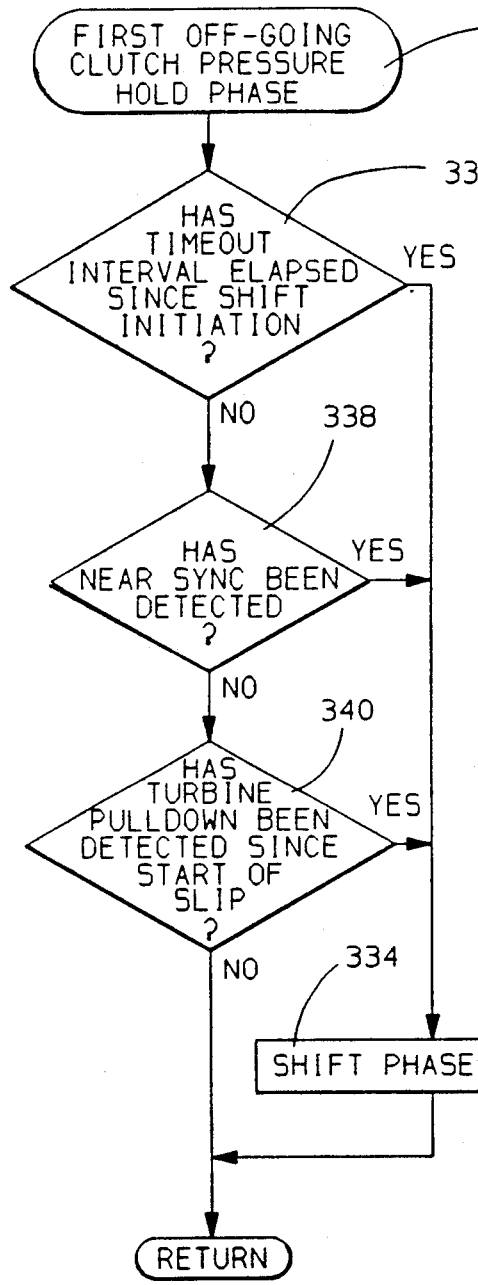

FIG. 15 shows the Pressure Hold phase routine. The SHIFT PHASE is set to End <334> (to exhaust the clutch <314>) if a timeout interval has elapsed since shift initiation <336>, near sync is detected <338>, or pull-down has been detected <340>. If none of these events occur, the routine returns control to the main loop.

Figure 16:
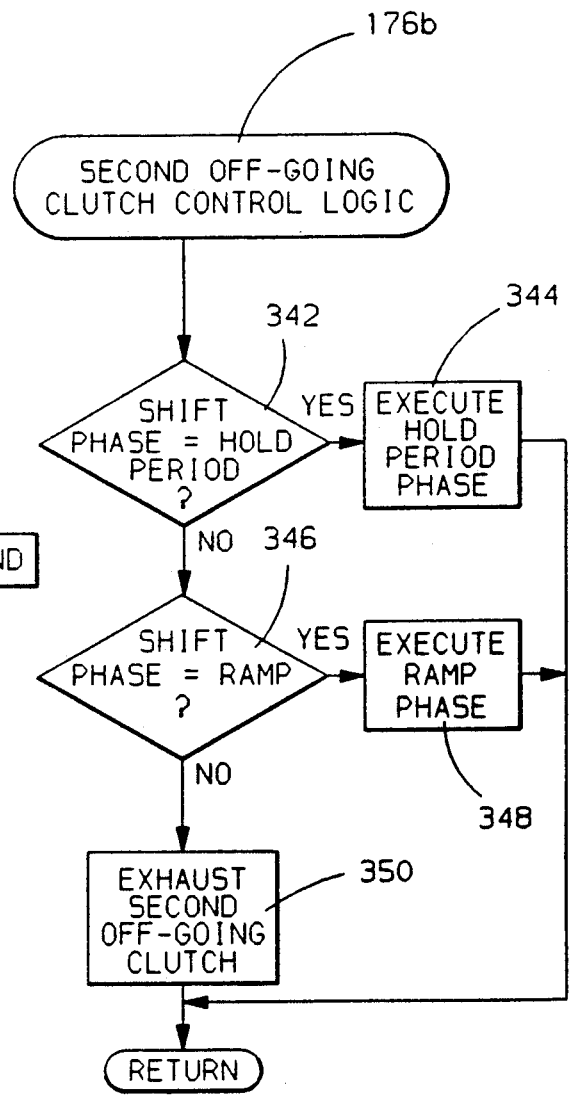
FIGS. 16 through 18 are flow diagrams for the second off-going clutch control logic, according to the invention.

The second Off-going clutch control logic 176b is shown in FIG. 16. If SHIFT PHASE is set to Hold Period <342>, the Hold Period phase is executed <344>. If SHIFT PHASE is set to Ramp <346>, Ramp phase is executed <348>. If neither, the clutch is exhausted <350>.

Figure 17:
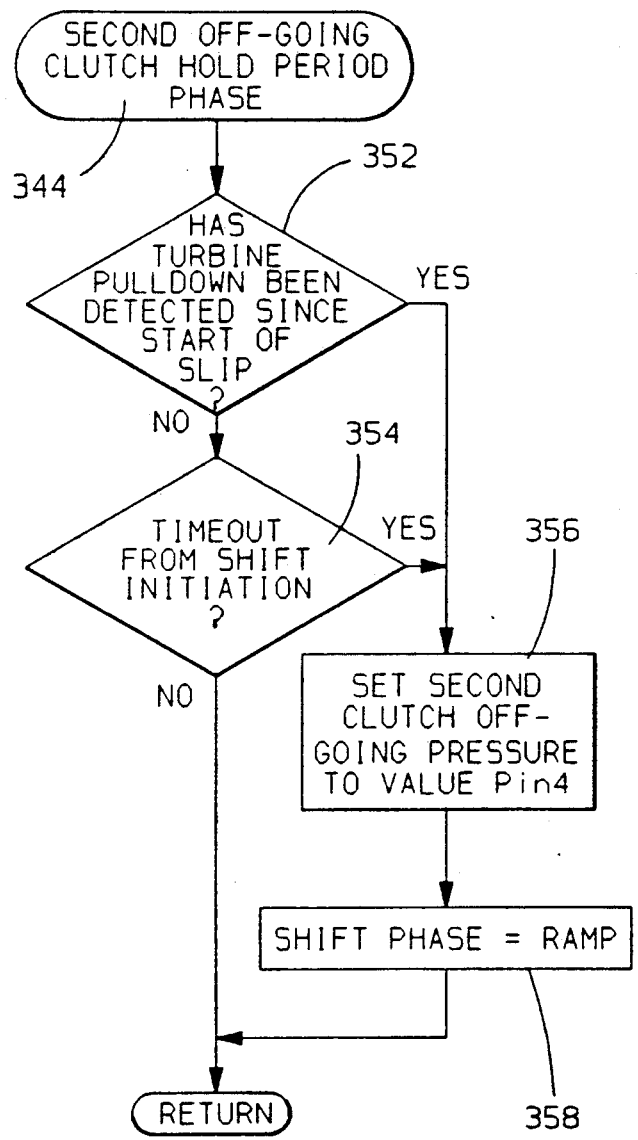

The Hold Period phase <344> is shown in FIG. 17. No action is taken and the routine returns to the main loop to maintain full pressure unless pull-down is detected <352> or a timeout interval since shift initiation has elapsed <354>. Then the second off-going clutch pressure is set to a given value Pin4 <356> and SHIFT PHASE is set to Ramp <358>.

Figure 18:
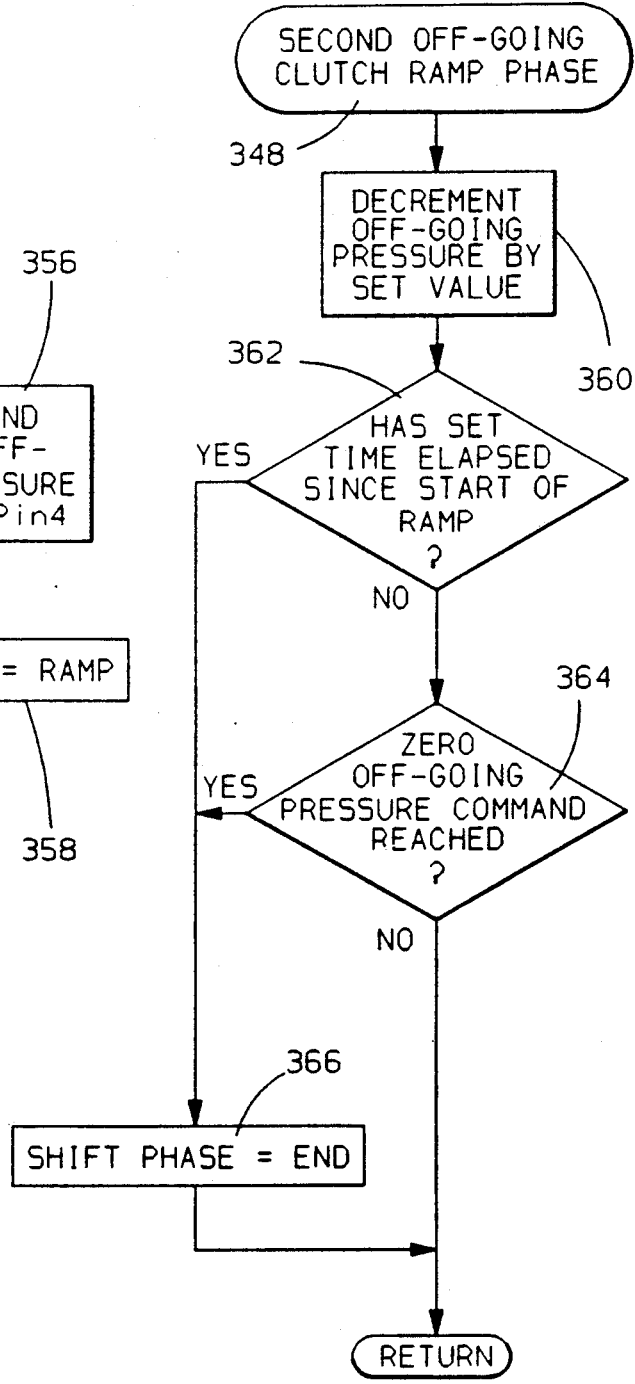

The Ramp phase 348 is shown in FIG. 18. Each time through the control loop the off-going pressure is decremented by a set value <360>. If a set time has elapsed since the start of the ramp <362> or the off-going pressure command has reached zero <364>, SHIFT PHASE is set to End to thereby exhaust the clutch <350>.

While this invention has been described in reference to the illustrated embodiment, it is expected that various modifications will occur to those skilled in the art. In this regard, it should be understood that systems incorporating such modifications may fall within the scope of this invention, which is defined by the appended claims.

The embodiments of the invention in which an exclusive property or privilege is claimed are defined as follows:

1. In a vehicular automatic transmission having input and output shafts, a turbine connected to the input shaft to couple driving torque thereto, in which a downshift from a first speed ratio to a second speed ratio lower than said first speed ratio is carried out through concurrent disengagement of first and second off-going fluid pressure operated torque transmitting devices and engagement of first and second on-coming fluid pressure operated torque transmitting devices, wherein the engagement of said second off-going torque transmitting device and said first on-coming torque transmitting device establishes a third speed ratio lower than said second speed ratio, and further having turbine and output speed sensing means, a method of controlling said torque transmitting devices to carry out a downshift from said first speed ratio to said second speed ratio comprising the steps of:
   gradually releasing said first off-going torque transmitting device,
   gradually engaging said first on-coming torque transmitting device in response to a detected slip of said first off-going torque transmitting device while said second off-going torque transmitting device is still engaged, thereby to begin a shift to said third speed ratio, and
   releasing said second off-going torque transmitting device and gradually engaging said second on-coming torque transmitting device in response to a detected pulldown of said turbine, thereby to complete a shift to said second speed ratio.

2. The method set forth in claim 1, including the step of releasing said first off-going torque transmitting device in response to a detected near synchronous speed of said turbine.

3. The method set forth in claim 1, wherein said transmission includes means for supplying fluid pressure to said torque transmitting devices in accordance with pressure commands for controlling their engagement and disengagement, the method including the steps of:
   commanding a step increase in said pressure supplied to said first off-going torque transmitting device in response to a detected slip of said first off-going torque transmitting device, which increase compensates for a decrease of the coefficient of friction in said first off-going torque transmitting device upon commencement of said slip, and
   commanding an exhaust of said pressure supplied to said first off-going torque transmitting device in response to a detected near synchronous speed of said turbine.

4. The method set forth in claim 1, wherein said transmission includes means for supplying fluid pressure to said torque transmitting devices in accordance with pressure commands for controlling their engagement and disengagement, and the step of gradually engaging said first on-coming torque transmitting device includes the steps of:
   commanding a pressure for said first on-coming torque transmitting device which increases at a first rate, and
   commanding said pressure to increase at a second rate higher than said first rate in response to said detected pulldown of said turbine.

5. The method set forth in claim 1, wherein the step of detecting pulldown of said turbine comprises determining when said turbine speed falls a set value below a peak turbine speed following said detected slip of said first off-going torque transmitting device.

6. In a vehicular automatic transmission having input and output shafts, a turbine connected to the input shaft to couple driving torque thereto, in which a downshift from a first speed ratio to a second speed ratio lower than said first speed ratio is carried out through concurrent disengagement of first and second off-going fluid pressure operated torque transmitting devices and engagement of first and second on-coming fluid pressure operated torque transmitting devices, wherein the engagement of said second off-going torque transmitting device and said first on-coming torque transmitting device establishes a third speed ratio lower than said second speed ratio, and means for supplying fluid pressure to said torque transmitting devices in accordance with pressure commands for controlling their engagement and disengagement, a method of controlling said torque transmitting devices to carry out a downshift from said first speed ratio to said second speed ratio comprising the steps of:
   initiating pressure commands for disengagement of said first off-going torque transmitting device and for engagement of said first on-coming torque transmitting device upon shift initiation,
   controlling said pressure commands to said first on-coming torque transmitting device and said first of-going torque transmitting device in response to a detection of slip of said first off-going torque transmitting device, to permit a controlled turbine speed increase followed by a pulldown of said turbine speed, and
   controlling said pressure commands to said second on-coming torque transmitting device and said second off-going torque transmitting device in response to said pulldown to synchronize said first and second on-coming torque transmitting devices.

7. The method set forth in claim 6, wherein the step of controlling said pressure command to said first off-going torque transmitting device includes setting said pressure command at a level which sustains said slip to allow said controlled turbine speed increase.

8. The method set forth in claim 6, wherein the step of controlling said pressure command to said first on-coming torque transmitting device includes establishing an initial pressure and a first rate of increase of pressure when said slip is detected, and a second rate of increase of pressure greater than said first rate when said pulldown is detected.

9. The method set forth in claim 6, including the steps of:

commanding a full release of pressure to the first off-going torque transmitting device in response to a detection of near synchronization of said turbine speed, and commanding application of full pressure to said first and second on-coming torque transmitting devices in response to a detection of synchronization of said turbine speed.

* * * * *